United States Patent [19]

Kwiecinski et al.

[11] Patent Number: 4,515,086
[45] Date of Patent: May 7, 1985

[54] ADJUSTABLE WORD PROCESSOR WORK STATION

[75] Inventors: Alfred Kwiecinski; Jon A. Yauger, both of Fairfield, Ohio

[73] Assignee: Hamilton Sorter Company, Inc., Fairfield, Ohio

[21] Appl. No.: 370,467

[22] Filed: Apr. 21, 1982

[51] Int. Cl.³ .............................................. A47B 57/00
[52] U.S. Cl. ......................................... 108/96; 108/95; 108/104; 108/105; 108/143; 312/196; 312/312
[58] Field of Search ...................... 108/94, 95, 96, 104, 108/105, 140, 141, 143; 312/196, 312, 208, 239; 248/419, 421

[56] References Cited

U.S. PATENT DOCUMENTS

| 197,290 | 11/1877 | Ransom | 312/312 X |
|---|---|---|---|
| 594,505 | 11/1897 | Welch et al. | 108/96 |
| 1,088,419 | 2/1914 | Heyer | 108/95 X |
| 1,247,590 | 11/1917 | Sprung | 312/312 |
| 2,531,880 | 11/1950 | Herring | 108/145 X |
| 2,610,099 | 9/1952 | McNamara, Jr. | 108/140 |
| 4,047,774 | 9/1977 | Hanning | 312/196 X |
| 4,345,803 | 8/1982 | Heck | 312/196 |
| 4,379,429 | 4/1983 | Gubbe et al. | 108/138 |

FOREIGN PATENT DOCUMENTS

| 1329551 | 5/1963 | France | 312/196 |
|---|---|---|---|
| 846161 | 8/1960 | United Kingdom | 108/145 |

*Primary Examiner*—James T. McCall
*Attorney, Agent, or Firm*—Frost & Jacobs

[57] ABSTRACT

A work station for a word processor having a keyboard and a separate console, the work station having a planar work surface with a front opening therein in which a keyboard receiving front platform is adjustably mounted for both upward and downward movement and for tilting movement relative to the work surface, the work surface also having a rear opening therein in which a console mounting rear platform is mounted, the rear platform being movable vertically relative to the work surface and additionally provided with means permitting forward and rearward as well as rotational and tilting movement of the console, all of the controls for adjusting the positions of the keyboard and console being accessible to an operator from the front of the work station.

14 Claims, 6 Drawing Figures

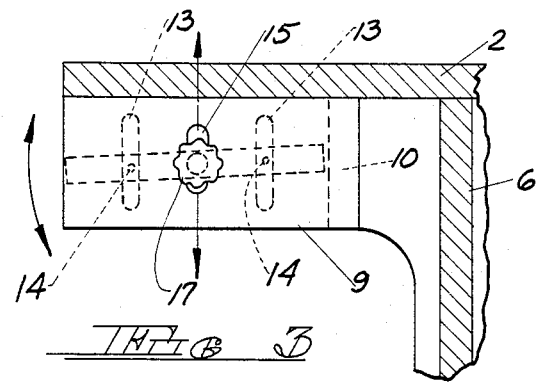
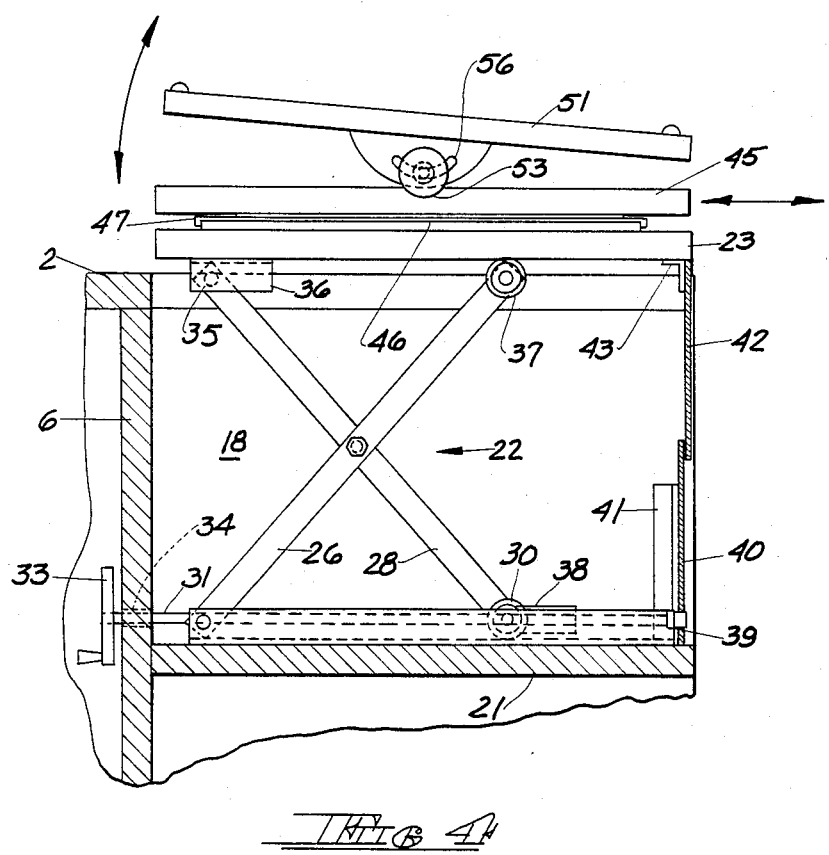

U.S. Patent   May 7, 1985   Sheet 3 of 3   4,515,086
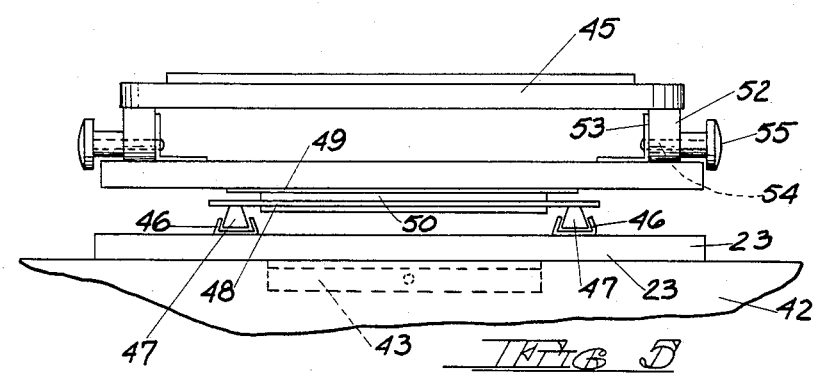
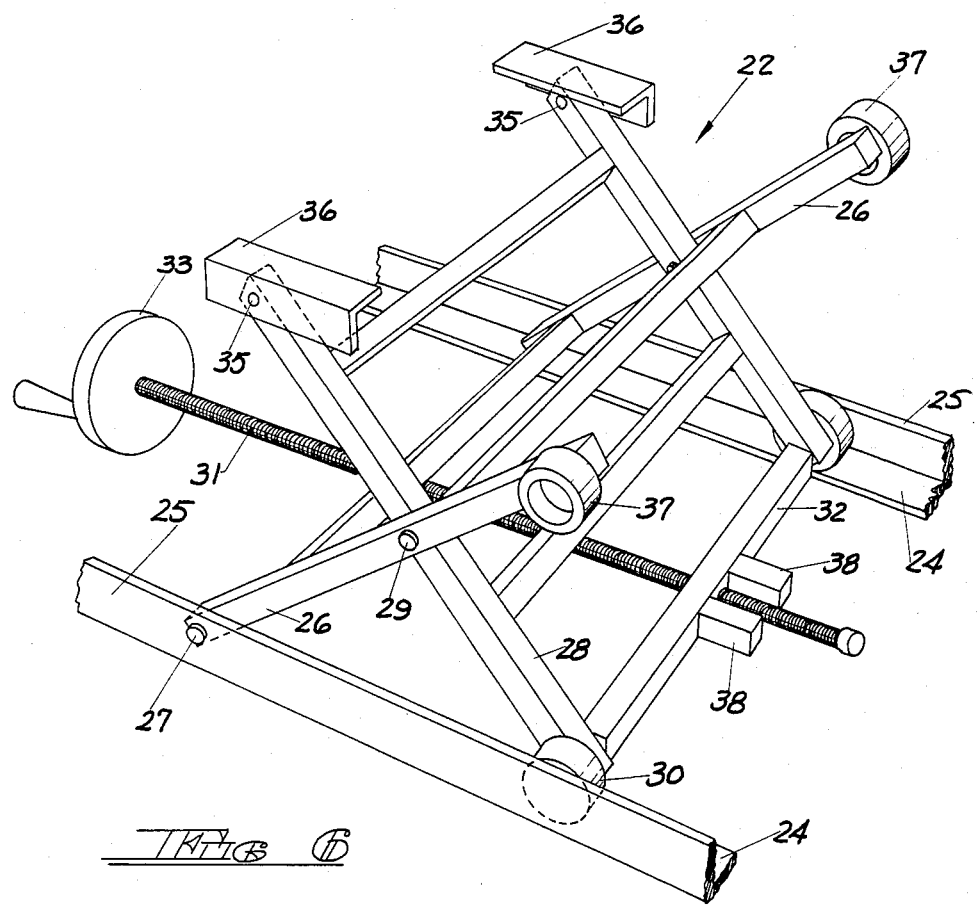

ADJUSTABLE WORD PROCESSOR WORK STATION

This invention relates to office furniture, and more particularly to a desk-like unit or work station specifically designed to adjustably accommodate word processing equipment.

BACKGROUND OF THE INVENTION

Electronic word processing equipment is now in widespread use in commercial and industrial applications. The basic components of a word processor comprise a console, which includes the viewing screen, and a keyboard. While in some units the console and keyboard are integral and are adapted to be placed on a conventional desk, the trend has been toward separating the console and keyboard into individual units which, while interconnected electrically, are movable relative to each other so that they may be conveniently positioned in accordance with the space available and the comfort of the operator.

There has been a growing realization that the comfort and well-being of the operator greatly effects productivity, and the term "ergonomics" is now being applied to efforts which seek to adapt working conditions to suit the worker.

Studies have indicated that operator fatigue can be materially reduced if the operator can adjust the relative positions of the keyboard and console as the day progresses. In keeping with these findings, it has hitherto been proposed to provide an adjustable stand for a word processor, the stand having a front section on which the keyboard is seated and a rear section on which the console is seated, the two sections being contiguous and movable vertically relative to each other. While such arrangement provides the ability to adjust the levels of the keyboard and console relative to the operator, the platform sections interrupt the work space available to the operator in that unless the platforms are at the same level the operator does not have an uninterrupted front to rear work surface on either side of the keyboard and console, as would be the case if the units were supported on a planar desktop or similar surface. In addition, the adjustability of the units is basically in a vertical direction although it has also been proposed to seat the console on a turntable to permit its rotation relative to the surface on which it is supported.

In contrast to the foregoing, the present invention provides a work station for the keyboard and console of a word processor which provides the operator with a full depth planar work surface and at the same time provides multidirectional adjustment of both the keyboard and console.

SUMMARY OF THE INVENTION

In accordance with the invention, the work station is in the nature of a rectangular desk-like structure having a planar top which may be of a size to provide any desired amount of working space. The top surface of the work station has a pair of openings therein, the first extending inwardly from the front side edge of the top and the second extending inwardly from the rear side edge thereof, the openings defining wells adapted to receive vertically movable platform members having a size corresponding to the size of the openings. The front platform member is of a size to support the keyboard of a word processor, and the rear platform is of a size to support the console of the word processor. The front or keyboard platform is movable downwardly within the front well to vary the position of the keyboard, the platform additionally being pivotally mounted for tilting movement about a horizontal axis so that the keyboard may be tilted either forwardly or rearwardly in accordance with the most comfortable position of use for the operator.

The rear platform, which supports the console, is movable vertically relative to the rear well which contains the mechanism for raising and lowering the rear platform. The rear platform in its lowermost position of use preferably coincides with the top surface of the work station, but is capable of being elevated relative thereto to raise the console to the desired elevated position.

A lower base member is mounted on the rear platform by means of a combined turntable and slide mechanism which permits the lower base member to be moved forwardly and rearwardly relative to the rear platform and also to rotate relative to the rear platform. Thus, the lower base member may be rotated irrespective of whether it is displaced forwardly or rearwardly relative to the rear platform. The lower base pivotally mounts an upper base which is tiltable forwardly and rearwardly relative to the lower base, and the console is seated on the upper base and hence is capable of multidirectional movement relative to the top of the work station and the operator, the rear platform serving to raise and lower the entire assembly, the lower base permitting forward and rearward movement of the console, as well as rotational movement thereof, and the upper base permitting forward and rearward tilting movement of the console.

Adjustment mechanisms are provided to enable the operator to raise, lower and tilt the front platform to the desired position of use, and readily accessible adjustment mechanism is also provided to permit the operator to tilt the upper base on which the console is seated, and the lower base is also readily accessible for rotational as well as forward and rearward movement of the console. The lifting mechanism for the rear platform, which is located in the rear well, is provided with a crank arm which is also readily accessible to the operator from the front of the work station. Consequently, all adjustments can be made without the operator having to leave her seat. A movable skirt is also provided for the rear well to shield the platform lifting mechanism irrespective of the vertical position of the platform.

DESCRIPTION OF THE DRAWINGS

FIG. 3 is an enlarged fragmentary sectional view taken along the line 3—3 of FIG. 2.

FIG. 4 is an enlarged fragmentary sectional view taken along the line 4—4 of FIG. 2.

FIG. 5 is a fragmentary rear elevational view of the rear platform illustrating the manner in which the lower and upper bases are mounted thereon.

FIG. 6 is a perspective view with parts broken away of the lifting mechanism for the rear platform.

DESCRIPTION OF THE PREFERRED EMBODIMENT

Figure 1:
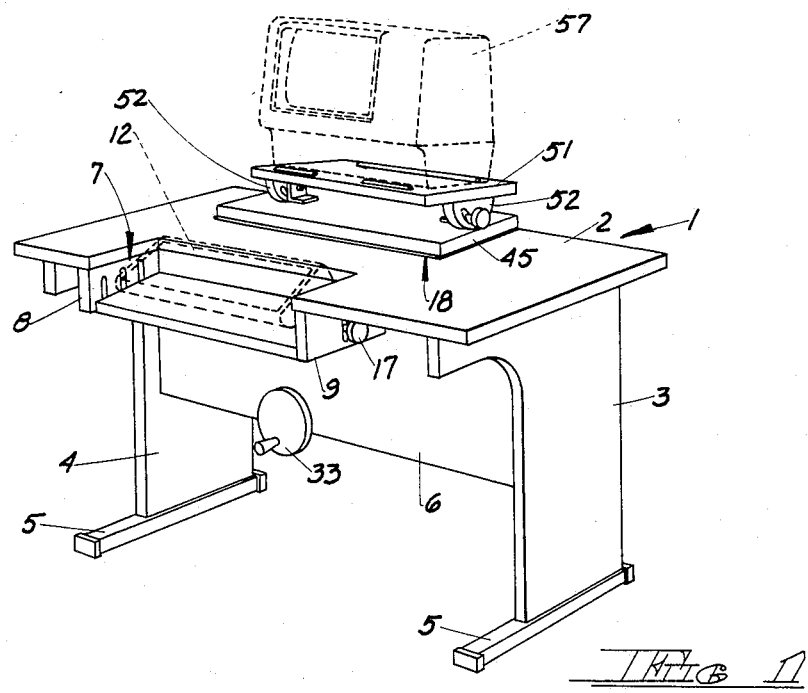
FIG. 1 is a front perspective view of an adjustable work station in accordance with the invention.

Referring first to FIG. 1, the work station is generally indicated at 1, the work station comprising a desk-like unit having a planar top 2 supported on leg-forming support panels 3 and 4 having feet 5, the support panels being interconnected by an intermediate verticle wall 6.

In accordance with the invention, the top 2 is provided with a front opening 7 projecting inwardly from the front side edge of the top intermediate its opposite ends. The opening 7 may be centrally disposed with respect to the top 2, or it may be displaced toward either end, depending upon the amount of work surface desired on either side of the opening.

Well-defining end walls 8 and 9, and a rear wall 10, project downwardly from the opening 7, with a front, keyboard supporting platform 11 positioned within the well-like opening defined by the rear and end walls. The keyboard unit which is adapted to be supported on the front platform is indicated in dotted lines at 12.

The platform 11 is of a size to just nicely fit within the confines of the end walls 8 and 9, and the rear wall 10. As best seen in FIG. 3, the end walls each has a pair of vertically disposed slots 13 adapted to slidably receive pairs of pins 14 projecting outwardly from the opposite ends of platform 11, the pins being loosely fitted within the slots which serve as guides for the front platform as it is raised and lowered. Each of the end walls is also provided with an intermediate vertically disposed slot 15 through which passes the threaded shank 16 of an adjustment knob 17, the threaded shank of each adjustment knob being in threaded engagement with the adjoining end of the front platform 11.

The adjustment knobs 16 are readily accessible to the operator, the knobs when loosened permitting the operator to raise or lower the front platform to the desired position of use, whereupon when the knobs are tightened they act to clamp the front platform 11 to the end walls 8 and 9. In addition to guiding the platform for vertical movement, the slots 13 and the pins 14 also permit the platform to be tilted forwardly and rearwardly about the axes of the threaded shanks 16 of the adjustment knobs. Such tilting movement is limited by the looseness of the fit between the pins 14 and the slots 13 in which they are received, preferably being a matter of a relatively few degrees in either direction. If a greater degree of tilting is desired, the slots may be of arcuate configuration.

Figure 2:
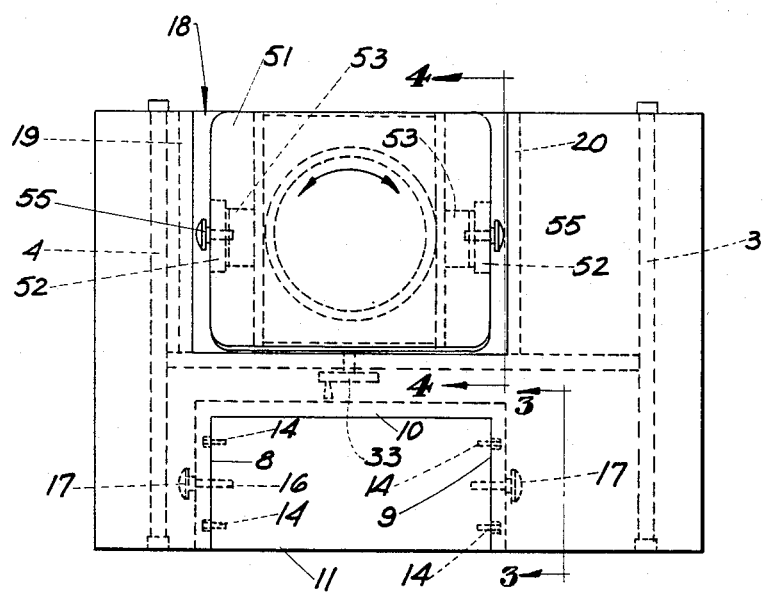
FIG. 2 is a top plan view of the work station.

The top 2 of the work station is also provided with a rear opening 18 extending inwardly from the rear side edge of the top intermediate its ends. This opening is substantially larger than the front opening 7 and terminates inwardly short of the front opening. Preferably the vertical wall 6 will be positioned to project downwardly from the innermost side edge of the rear opening, and additional vertical end walls 19 and 20, seen in FIG. 2, project downwardly from the opposite ends of the rear opening 18 to define a rear well therebetween. As seen in FIG. 4, the bottom of the rear well is closed by a bottom wall 21 which provides a support for the lifting mechanism 22 which, in turn, supports rear platform 23 and acts to raise and lower the rear platform relative to the top surface 2 of the work station.

As seen in FIG. 6, the lifting mechanism 22 comprises a pair of tracks 24 adapted to be secured to the bottom wall 21 of the rear well, the tracks having upstanding flanges 25 to which the lowermost ends of the frame members 26 are pivotally attached by pivot pins 27. The frame members 26 are pivotally connected intermediate their ends to coacting frame members 28 by means of pivot pins 29, the sets of frame members 26 and 28 defining X-frames which may be raised and lowered relative to the tracks 24, the lowermost ends of the frame members 28 mounting rollers 30 adapted to move lengthwise along the tracks 24, movement of the pairs of frame members relative to each other being controlled by a threaded shaft 31 in threaded engagement with the cross brace 32 extending between the wheels 30 at the lowermost ends of frame members 28. The threaded shaft is adapted to be rotated by a handwheel 33, the threaded shaft 31 extending forwardly through an opening 34 in the vertical wall 6, as seen in FIG. 4.

At their upper ends the frame members 28 are pivotally connected at 35 to angle brackets 36 secured to the undersurface of rear platform 23, as also will be evident from FIG. 4. The upper ends of the frame members 26 mount rollers 37 adapted to contact the undersurface of rear platform 23. With this arrangement, rotation of the handwheel 33, which is accessible to the operator from the front of the work station, causes the rear platform 23 to be raised and lowered relative to the rear opening in the top of the work station. Stops 38 may be provided on the cross brace 32 to establish the lowermost position of the platform 23 when the stops contact an abutment 39 projecting upwardly from the bottom wall 21 adjacent its rear side edge.

The outer side of the rear well is closed by a lower wall panel 40 fixedly secured to the bracket 39 and to additional brackets 41 secured to the rear edges of the well defining end walls 19 and 20. An upper wall panel 42 is secured to the rear side edge of rear platform 23 by a bracket 43, the upper wall panel 42 being adapted to overlap the lower wall panel 40, the upper wall panel 42 being movable vertically with the rear platform 23, thereby closing the rear of the well irrespective of the vertical position of the rear platform.

As seen in FIG. 5, rear platform 23 mounts a combined turntable and slide mechanism 44, which permits the lower base member 45 to be moved forwardly and rearwardly relative to the rear platform and also to be rotated relative thereto. The turntable and slide mechanism, which is of known construction, comprises a pair of generally U-shaped track members 46 adapted to slidably receive slide bars 47, the parts being configured to retain the slide bars in engagement with the tracks. A lower plate 48 is secured to the slide bars 47 and connected to an upper plate 49 by means of a circular bearing race 50 which permits relative rotation between the upper and lower plates. The upper plate 49 is secured to the undersurface of lower base member 45, thereby mounting it for both forward and rearward sliding movement and for rotational movement relative to the lower platform 23.

An upper base member 51 having rockers 52 is mounted on the lower base member 45 by means of angle brackets 53 which are engaged by the threaded shank 54 of adjustment knobs 55 adapted to releasably clamp the rockers 52 to the brackets 53, the rockers, as seen in FIG. 4, being provided with arcuate slots 56 through which the threaded shanks 54 pass, the arrangement permitting the upper base 51 to be tilted from the horizontal relative to the lower base 45 and secured in the desired tilted position.

When a word processor console 57, seen in FIG. 1, is seated on the upper base 51, its position relative to the operator may be raised and lowered by means of the crank 33 which actuates the lifting mechanism 22 to raise and lower rear platform 23. The console may be moved toward or away from the operator by means of platform 45, which is also utilized to rotate the console to the desired angular position relative to the operator. Tilting movement of the console is obtained by tilting the upper base member 51 utilizing the adjustment knobs 55.

As should now be evident, the work station of the present invention provides the operator with a wide spectrum of adjustment, with both the keyboard and the console being adjustable to the needs and comfort of the operator. At the same time, the operator is provided with uninterrupted work space on either side of the keyboard and console the area of which may be chosen as desired depending upon the dimensions of the planar top of the unit.

What is claimed is:

1. A work station for a word processor having a keyboard and a separate console, said work station comprising:
   a planar general rectangular work surface;
   a front opening in said work surface extending inwardly from the front edge of said work surface intermediate the opposite ends thereof;
   a front platform of a size to mount a keyboard thereon received within said front opening;
   means for raising and lowering said front platform relative to said work surface;
   a rear opening in said work surface extending inwardly from the rear edge thereof intermediate the opposite ends thereof, said rear opening terminating short of said front opening;
   a rear platform of a size to be received within said rear opening, said rear platform being adapted to mount a console thereon;
   means for raising and lowering said rear platform relative to said front opening, means in association with said rear platform for moving a console mounted thereon forwardly and rearwardly relative to said rear platform, means in association with said rear platform for rotating a console mounted thereon in a horizontal plane relative to said rear platform, and means in association with said rear platform for tilting said rear platform about a horizontal axis, whereby the front and rear platforms may be independently adjusted relative to said planar work surface to thereby adjust the relative positions of the keyboard and console of a word processor.

2. The work station claimed in claim 1 including means in association with said front platform for tilting the platform about a horizontal axis.

3. The work station claimed in claim 1 wherein end walls project downwardly from the opposite ends of said front opening, wherein each of said end walls has a vertical slot therein, and wherein the means for raising and lowering said front platform comprises adjustment knobs having threaded shanks projecting inwardly through said slots, the inner ends of said threaded shanks being in threaded engagement with the adjacent ends of said front platform.

4. The work station claimed in claim 3 including means for tilting said front platform relative to said planar work surface about a horizontal axis extending lengthwise of said front platform.

5. The work station claimed in claim 4 wherein the means for tilting said front platform comprises additional vertically disposed slots in said end walls, and pins projecting outwardly from the ends of said front platform, said pins being engaged in said additional slots.

6. The work station claimed in claim 1 wherein a bottom wall underlies said rear opening in spaced relation thereto, and wherein the means for raising and lowering said rear platform comprises a lifting mechanism mounted on said bottom wall and operatively connected to said rear platform, said lifting mechanism including actuating mechanism accessible from the front of said work station.

7. The work station claimed in claim 6 wherein said rear opening and said bottom wall define a well therebetween, and panel means closing the rear of said well, said panel means comprising a first panel secured and projecting upwardly from said botton wall to close the lower rear portion of said well, and a second panel secured to and projecting downwardly from said rear platform, said second panel overlapping said first panel, whereby said second panel will move relative to said first panel as said rear platform is raised and lowered.

8. The work station claimed in claim 1 wherein the means in association with said rear platform for moving a console mounted thereon forwardly and rearwardly comprises a base member overlying said rear platform, and slide means mounting said base member for slidable movement relative to said rear platform.

9. The work station claimed in claim 1 wherein the means in association with said rear platform for rotating a console mounted thereon comprises a base member overlying said rear platform, and means mounting said base member for rotational movement relative to said rear platform.

10. The work station claimed in claim 8 including turntable means in association with said slide means for additionally mounting said base member for rotation relative to said rear platform.

11. The work station claimed in claim 1 wherein the means in association with said rear platform for tilting said rear platform comprises a base member overlying said rear platform, and adjustment means for tiltably mounting said base member relative to said rear platform.

12. The work station claimed in claim 11 wherein said adjustment means comprises rockers depending from said base members for contact with an underlying supporting surface, bracket means projecting upwardly from the underlying surface adjacent said rockers, arcuate slots in said rockers, and adjustment knobs having threaded shanks extending through said slots and in threaded engagement with said bracket means.

13. The work station claimed in claim 12 wherein the underlying support surface comprises a second base member interposed between said rear platform and said first named base member, and means mounting said second base member for movement in a horizontal plane relative to said rear platform.

14. The work station claimed in claim 13 wherein the means mounting said second base member for movement in a horizontal plane comprises a combined slide and turntable mounting said second base member for front to rear sliding movement and for rotational movement relative to said rear platform.

* * * * *